March 10, 1953 D. S. CHISHOLM ET AL 2,630,623
METHOD OF MAKING DIE-EXPRESSED ARTICLES
OF MAGNESIUM-BASE ALLOYS
Filed Nov. 12, 1948 2 SHEETS—SHEET 1

INVENTORS.
Robert S. Busk
Douglas S. Chisholm
BY
Griswold & Burdick
ATTORNEYS

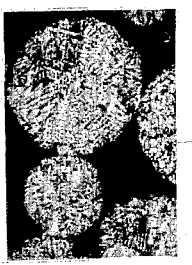  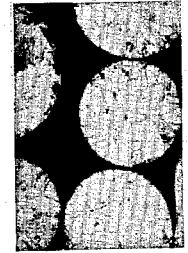 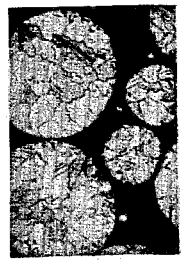
Fig. 6　Fig. 7　Fig. 8　Fig. 9
 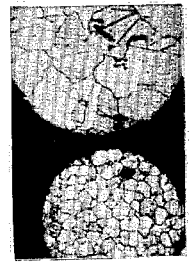 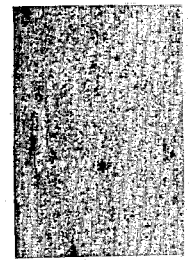 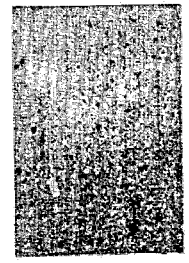
Fig. 10　Fig. 11　Fig. 12　Fig. 13
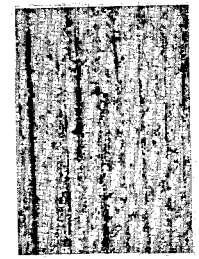 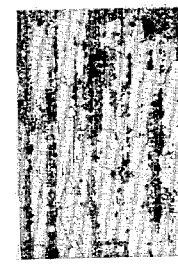 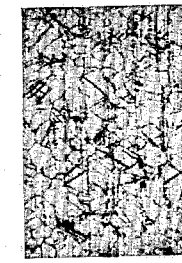 
Fig. 14　Fig. 15　Fig. 16　Fig. 17

Patented Mar. 10, 1953

2,630,623

UNITED STATES PATENT OFFICE 2,630,623

METHOD OF MAKING A DIE-EXPRESSED ARTICLE OF A MAGNESIUM-BASE ALLOY

Douglas S. Chisholm and Robert S. Busk, Midland, Mich., assignors to The Dow Chemical Company, Midland, Mich., a corporation of Delaware Application November 12, 1948, Serial No. 59,584

3 Claims. (Cl. 29—148)

1

The invention relates to die-expressed articles of magnesium-base alloys. It more particularly concerns an improved method of producing die-expressed articles of magnesium-base alloys of the solid solution type whereby high values of their mechanical properties are attained.

We have discovered that by forming a magnesium-base alloy of the solid solution type into a mass of atomized particles, heating the mass, compacting the heated mass, and then die-expressing the heated compacted mass to form an extruded or die-expressed article, the heating, compacting, and die-expression being completed in a matter of minutes, exceptionally desirable values of mechanical properties are exhibited. The invention then consists of the method hereinafter fully described and particularly pointed out in the claims.

In carrying out the invention, a magnesium-base alloy is used which comprises a solid solution. The usual commercial magnesium-base alloys contain upwards of 80 per cent of magnesium and one or more alloying constituents all of which form solid solutions with the magnesium. These alloying constituents are: aluminum, cerium, manganese, zinc and zirconium. Examples of other solid solution-forming constituents are: bismuth, cadmium, gallium, indium, lead, lithium, silver, thallium, and tin. Although the invention may be practiced with any magnesium-base alloy of the solid solution type containing at least 0.3 per cent of the solid solution-forming metal, its greatest commercial value is believed to lie in its application to the commercially valuable magnesium-base alloys as these all normally contain at least one solid solution-forming constituent in amount sufficient to achieve the objects of the invention. Table I lists all the commercial magnesium-base alloys currently in vogue in the U. S. A. with their A. S. T. M. designations and nominal compositions.

2

TABLE I

*Magnesium-base alloys*

| Alloy No. | A. S. T. M. Designation | Nominal Composition [1] | | | | |
|---|---|---|---|---|---|---|
| | | Al | Mn | Zn | Zr | Ce |
| 1 | A3 | 3 | 0.2 | | | |
| 2 | A4 | 4 | 0.3 | | | |
| 3 | A8 | 8 | 0.1 | | | |
| 4 | A10 | 10 | 0.1 | | | |
| 5 | A12 | 12 | 0.1 | | | |
| 6 | AZ31 | 2.8 | 0.3 | 1.0 | | |
| 7 | AZ33 | 3 | 0.2 | 3 | | |
| 8 | AZ61 | 6.5 | 0.2 | 0.7 | | |
| 9 | AZ63 | 6 | 0.2 | 3 | | |
| 10 | AZ81 | 8.5 | 0.2 | 0.5 | | |
| 11 | AZ91 | 9 | 0.2 | 0.6 | | |
| 12 | AZ92 | 9 | 0.1 | 2.0 | | |
| 13 | E6 | | | | | 6 |
| 14 | EM42 | | 2 | | | 4 |
| 15 | EM62 | | 2 | | | 6 |
| 16 | M1 | | 1.5 | | | |
| 17 | M2 | | 2 | | | |
| 18 | ZK30 | | | 3 | 0.7 | |
| 19 | ZK60 | | | 6 | 0.7 | |

[1] Balance commercial magnesium.

The alloy to be used is brought to the molten state in any convenient manner in preparation for atomizing. Temperature in the order of 50 to 150 Fahrenheit degrees above the melting point of the alloy are desirable although other temperatures may be used at which the alloy is in the molten state. It is preferable to use the lower temperatures of the molten state so as to reduce the degree of hazard involved in handling the molten alloy and the amount of heat which is to be removed to permit the molten alloy to return to the solid state.

The alloy, while in the molten state, is subjected to a dispersion and chilling operation whereby the metal is obtained in atomized form, that is, in the form of fine individually frozen discrete particles. There are various ways in which atomization may be performed and any one of them may be used. The most convenient appears to be directing a jet of an inert cooling gas against an unconfined stream of the molten alloy.

For example, a freely falling stream of the molten alloy may be broken into droplets and solidified by impinging upon the stream, an inert gas, such as a hydrocarbon gas (e. g. methane, ethane, propane, butane, etc.), argon, helium, hydrogen, the inert gas having a temperature below the melting point of the molten metal. A wide range of particle sizes, although small, usually results from the atomizing operation. The atomized powder comprises more or less spherical particles for the most part ranging in size from about 10- or 20-mesh to as small as 200-mesh. A small percentage of the particles may be larger than 10-mesh and smaller than 200-mesh. A typical sieve analysis is as follows:

Retained on 48-mesh 15 per cent; through 48-mesh and retained on 100-mesh 60 per cent; through 100-mesh retained on 200-mesh 20 per cent; through 200-mesh 5 per cent.

As a result of the atomizing operation, there is imparted to each particle of the magnesium alloy a special microstructure essential in achieving the objects of the invention. This structure is characterized by extremely fine grains (0.001 inch–0.02 inch diameter) largely composed of sharply cored dendrites of the solid solution phase. This microinhomogeneous structure is exhibited by all the magnesium-base alloys in atomized form (a frozen dispersion of the melt) containing one or more solid solution-forming constituents in a total concentration of at least about 0.3 per cent. The term "atomized metal" as used herein and in the appended claims has the conventional metallurgical meaning of chilled, solidified droplets of molten metal produced by any of the known atomizing methods. The size of the droplets that yield the desired microstructure on being chilled to solidification in the atomizing operation does not appear to be sharply critical. We have found that the atomized metal particles, resulting from any of the conventional atomizing operations on an aforesaid solid solution type of magnesium-base alloy, exhibit the desired fine grain dendritic cored solid solution structure suitable for use in the method.

In the next step of the method, the atomized metal is heated, preferably in bulk, by contact with a heated metal surface, in preparation for compacting and die-expression. The temperature to which the metal is heated is within the conventional plastic deformation temperature ranges for magnesium-base alloys, usually between about 550° F. and 950° F. A preferred range is about 600° to 800° F. This heating operation is critical as regards the time at heat, for excessively prolonging the heating time results in destroying the microinhomogeneity which it is desired to retain at least until the operations of heating, compacting, and die-expression are completed.

We have found that the as-atomized magnesium-base alloy may be heated in bulk to the desired temperature with surprising rapidity (i. e. a matter of seconds) merely by placing it in a heated metal vessel and allowing the atomized metal to be in contact with the inside of the vessel. As a consequence, we are able to charge the heated container of a die-expressing apparatus, for example, with as-atomized metal and proceed with the operation of the apparatus to effect die-expression without destroying the as-atomized structure of the alloy. Normally, it takes a few seconds for the charge in the die-expression apparatus to reach extrusion pressures. During this interval of time the charge of metal reaches the plastic deformation temperature and is compacted by the pressure exerted upon the metal by the plunger of the apparatus before extrusion commences. The hot compacted metal extrudes from the die, as soon as extrusion pressures are reached, which pressures are comparable to conventional extrusion pressures, with an elongated microinhomogeneous grain structure possessing unusually high values of strength and toughness.

The invention may be further explained by reference to the accompanying drawings in which:

Fig. 6 is a photomicrograph at 100 diameters of atomized magnesium-base alloy having a nominal composition of 2.8 per cent aluminum, 1 per cent zinc, 0.3 per cent manganese, the balance being magnesium, showing the microstructure thereof in the as-atomized condition.

Figs. 7, 8, 9, 10 and 11 are photomicrographs at 100 diameters of a series showing the microstructure of the atomized alloy of Fig. 6 after one hour's heat treatment at 500°, 600°, 700°, 800°, and 850° F., respectively.

Figs. 12 and 13 are photomicrographs at 100 diameters showing the microstructure resulting from die-expression at 600° F. and 800° F., respectively, of the compacted atomized alloy of Fig. 6.

Figs. 14 and 15 are photomicrographs at 100 diameters showing the microstructure resulting from die-expression at 600° F. and 800° F., respectively, of compacted heat-treated atomized metal of Fig. 11.

Fig. 16 is a photomicrograph at 100 diameters showing the microstructure of a magnesium-base alloy composed of 6 per cent of aluminum and a balance of magnesium, resulting from die-expression at 700° F. of a compact of the mechanically comminuted as-cast billet of the alloy.

Fig. 17 is a photomicrograph at 100 diameters of the same alloy as that of Fig. 16 showing the microstructure resulting from die-expression at 700° F. of a solid as-cast billet of the alloy.

(In Figs. 12 to 17 inclusive the direction of die-expression is lengthwise of the page.)

Figure 1:
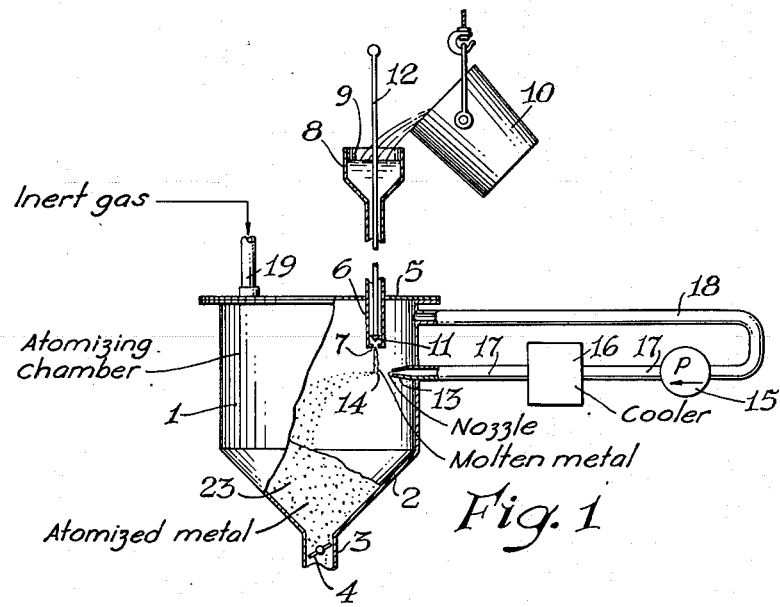
Fig. 1 is a schematic elevational view largely in section of apparatus for atomizing the magnesium alloy.
Figure 2:
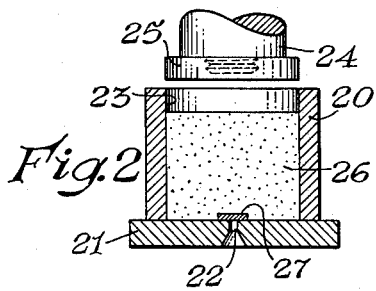
Fig. 2 is a schematic sectional view of die-expressing apparatus comprising a container with associated die and plunger, showing the container charged with atomized magnesium-base alloy in readiness for the compacting stage of the method.

Referring to the apparatus of Fig. 1, it is seen to comprise an atomizing chamber 1 having a hopper bottom 2 provided with an outlet 3 controlled by a valve 4. Projecting into the chamber 1 through the top 5 is the standpipe 6, the lower end of which is provided with a discharge orifice 7. The upper end of the standpipe carries a funnel 8 into which the molten magnesium-base alloy 9, to be atomized, is introduced as from the tilting ladle 10. The opening of the orifice 7 may be regulated by the tapered plug 11 which may be moved into or out of the orifice 7 by the control rod 12. Below the orifice 7 is arranged the nozzle 13 for impinging a jet of gas against the molten metal 14 issuing from the orifice 7. The nozzle 13 is connected to the gas compression pump 15 through the compressed gas cooler 16 by pipes 17. The pump 15 draws gas from the atomizing chamber 1 through pipe 18. A supply of a suitable gas may be admitted to the chamber 1 through the pipe connection 19.

Referring to Figs. 2, 3, 4, and 5, there is shown the container 20 of a die-expression device to which is secured the die 21. The die is provided with an orifice 22 for shaping the metal expressed therethrough. In alignment with the bore 23 of the container is the ram 24 carrying the plunger 25. The ram is actuated by a hydraulic cylinder not shown.

In using the apparatus illustrated the magnesium-base alloy in the melted state is poured into the funnel 8 from a tilting ladle 10 so as to keep the standpipe 6 filled to a suitable depth with the molten metal. The molten metal issues from the orifice 7 at a rate which is governed by the height of metal in the standpipe and the setting of the tapered plug 11 in the orifice 7. A circular orifice between about 0.125 and 0.25 inch in diameter used with a liquid metal head in the standpipe of about 2 to 10 feet produces a satisfactory rate of flow, although other dimensions may be used. As the molten metal issues from the orifice in the form of the stream 14, cool inert gas issuing from the nozzle 13 is impinged upon the molten metal 14. The inert gas may be supplied to the chamber 1 through the connection 19 and the compression pump draws upon the supply through pipe 18, compresses the gas, and delivers it through pipes 17 and the cooler 16 to the aforesaid nozzle at a temperature below the melting point of the alloy. The inert gas is thus recirculated and cooled, preferably from 100 to 300 Fahrenheit degrees below the melting point of the alloy, and gas losses from the system are made up as needed through the connection 19. The inert gas may be delivered to the nozzle at various pressures. We have found that satisfactory atomization of the metal takes place with pressures of 50 to 500 pounds per square inch at the nozzle, although other pressures may be used. As the gas issues from the nozzle it impinges upon and breaks up the molten metal stream 14 into innumerable droplets which are quickly cooled and frozen by the gas into discrete particles. The atomized particles fall into the hopper 2, making a pile 23, from which they may be withdrawn as needed through the outlet 3.

By atomizing the alloy the particles obtained possess a characteristic fine grain structure consisting almost entirely of a mocroinhomogeneous solid solution phase in the form of fine dendrites. As illustrative of this structure reference may be had to Fig. 6. In obtaining this and similar photomicrographs shown herein, a small quantity of the as-atomized magnesium alloy was embedded in a matrix of a conventional thermosetting phenol-formaldehyde resin. After setting the matrix a plane section was made and polished so as to expose sections of a number of the as-atomized particles of the alloy. After polishing, the section was etched by exposing the polished surface for five seconds at room temperature to the etching action of an etchant having the following nominal composition: 100 cc. of 6 per cent solution of picric acid in ethyl alcohol, 10 cc. of water, and 5 cc. of glacial acetic acid. This etchant clearly brings out the microinhomogeneity of the solid solution phase, its dendritic form, and the general outline of the grains of the structure. This etchant was used in the preparation of all photomicrographic specimens herein.

A quantity of the as-atomized metal is withdrawn from the hopper 2 and transferred to the container 20 so as to form therein the charge 26. Before placing the charge in the container, if the die opening 22 is not already temporarily plugged, as with previously die-expressed metal, a piece 27 of magnesium alloy is placed over the die opening 22 to prevent the escape of the atomized metal, which is a free-flowing powder until compacted. The container and die are maintained at a temperature suitable for die-expressing the magnesium alloy involved. The charge very quickly acquires the temperature of the container, usually heating to temperature in a matter of seconds, e. g. 5 to 50 seconds, depending upon the inside dimensions of the container. A charge in a container having a diameter of 3 inches, for example, will be at working temperature in about 15 to 20 seconds. The plunger 25 is brought to bear upon the charge promptly after placing it in the container so as not to unduly prolong the time the atomized metal is at heat and thus to avoid any substantial homogenization of the microinhomogeneous structure which is to be preserved during heating, compacting, and extrusion.

The effect of prolonged heating alone on the microstructure of the atomized metal is illustrated in the series of photomicrographs of Figs. 7 to 11 inclusive, the specimens of which were mounted and etched in similar manner to that of Fig. 6. It will be observed that the coring evident in the as-atomized structure of Fig. 6 begins to disappear within an hour's heating at 500° F. as shown in Fig. 7. As the temperature is raised the degree of homogenization progressively increases, as shown by the specimens of Figs. 8, 9, 10, and 11, which were heated for the same length of time at progressively higher temperatures as noted.

Figure 3:
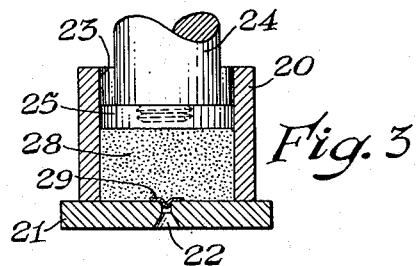
Fig. 3 is a similar view to Fig. 2 showing the atomized metal charge in the compacted stage preceding die-expression.
Figure 4:
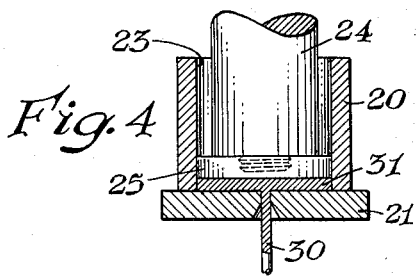
Fig. 4 is a similar view to Fig. 2 showing the completion of the die-expressed stage of the method.
Figure 5:
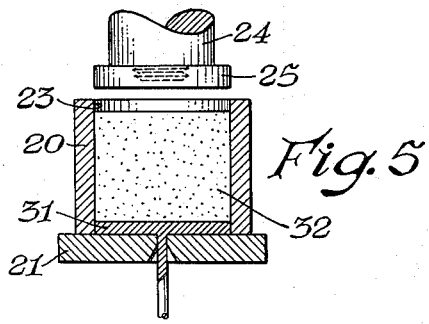
Fig. 5 is a similar view to Fig. 2 showing the plunger retracted and a heel of the compacted metal left from the die-expression stage and a fresh charge of atomized metal in the container in readiness to repeat the method.

As the movement of the plunger 25 continues into the container 20 the heated charge becomes compacted to about 66 per cent of the volume of the charge as shown at 28, Fig. 3. When sufficient pressure is applied to the compacted mass it causes the metal piece 27 to be deformed as at 29, after which it extrudes through the die opening 22, and is followed by the compacted atomized metal in the form of the die-expressed bar 30 as shown in Fig. 4. Suitable rates of extrusion are about 2 to 20 feet per minute, although other rates may be used.

It is preferable to leave a heel 31 of compacted metal in the container at the end of the die-expressing or extrusion stroke of the plunger 25 (Fig. 4) to provide a temporary seal for the die opening while a fresh charge 32 (Fig. 5) is placed in the container and the plunger 25 is retracted in preparation for a repetition of the cycle of operations. The heel 31 obviates the need for the use of the piece 27.

The amount of reduction in the cross sectional dimensions of the compact effected by the extrusion or die-expression is subject to wide variation and may be from about 8 to 1 to as much as 2500 to 1 or more (i. e. from about 85 per cent to over 99 per cent reduction in cross sectional area), depending upon the strength of the apparatus, as is well understood in the art. However, for the purpose of securing the property improvement desired in accordance with the invention, the amount of cross sectional reduction need not exceed about 24 to 1 (about 96 per cent).

As an illustration of the properties obtainable, the following example is cited.

EXAMPLE

In accordance with the invention a quantity of atomized magnesium alloy having a nominal composition of 2.8 per cent aluminum, 0.3 per cent manganese, 1.0 per cent zinc, the balance being magnesium, was charged into a cylindrical container 4 inches in internal diameter, the container being at 700° F. The charge had a depth of about 6 inches and was compacted at 700° F. in the container to a compact about 4 inches long. The compact was then die-expressed at the same temperature at the rate of 10 feet per minute into a slab having a rectangular cross section 3 inches by 0.5 inch, the reduction in area being about 8.4 to 1 (88 per cent) and the heating, compacting, and die-expression being completed within 1 minute.

For comparison similar extrusions were made of the same alloy at the same temperature (700° F.) and at the rate of 5 feet per minute with the same container and die (reduction in area 8.4 to 1), the charge being in the form of a solid conventional cast billet for one series of extrusions, and in the form of comminuted metal obtained by machining a conventional solid cast billet for another series of tests, and in the form of comminuted extruded metal for still another series of tests. The comminuted metal had a particle size comparable to that of the atomized metal (i. e. 100 per cent through 48-mesh and retained on 100-mesh) and was compacted in similar manner to that of the atomized metal before extrusion, the operations being performed in comparable time. The results obtained are set forth in Table II.

TABLE II

*Extruded properties*

| Property Measured [1] | Direction | Form of Metal before Extrusion | | |
|---|---|---|---|---|
| | | Compact of Atomized Alloy | Solid Cast Billet | Compact of Comminuted— |
| | | | | Extruded Metal | Cast Metal |
| Percent Elongation in 2 inches | L | 20.5 | 16 | 13.5 | 18.8 |
| | T | 10.0 | 16 | 2.5 | 10.5 |
| Tensile yield strength | L | 29,700 | 26,000 | 20,200 | 24,000 |
| | T | 30,500 | 24,000 | 23,300 | 28,400 |
| Compression yield strength | L | 27,800 | 12,000 | 12,400 | 21,400 |
| | T | 25,400 | 12,000 | 11,900 | 20,800 |
| Ultimate tensile strength | L | 42,000 | 40,000 | 35,000 | 39,200 |
| | T | 41,700 | 38,000 | 26,500 | 38,800 |
| Impact: | | | | | |
| Plain | L | 37 | 35 | 24 | |
| Do | T | 17 | 35 | 5.0 | |
| Notched | L | 12.5 | 4.0 | 12.0 | |
| Do | T | 5.6 | 4.0 | 4.0 | |

[1] Strength values in pounds per square inch. The yield strength is defined as the stress at which the stress-strain curve deviates 0.2% from the modulus line. Impact values are in foot pounds absorbed with unnotched Charpy test bars (plain) and notched Charpy test bars (notched).
L = longitudinal; T = transverse direction with respect to the direction of the extrusion.

Referring to Table II, it will be observed that by the method of the invention (first column of figures) much higher strengths are achieved than by either the conventional extrusion of solid cast billet or comminuted metal whether of cast or extruded origin. The unique microstructure exhibited by the product of the method is shown in Figs. 12 and 13. In obtaining the specimens for these photomicrographs a quantity of the as-atomized alloy of Example 1 was heated, compacted, and die-expressed, at 600° F. and 800° F. respectively, in a 3-inch container into ⅜-inch diameter rod at 5 feet per minute, the heating, compacting, and die-expression being completed within 8 minutes. It will be observed that the fine grain dendritic cored solid solution structure of Fig. 6 has been worked into an extremely fine elongated grain structure, the grains on the average being at least as fine as those in the as-atomized alloy. On the other hand similar extrusions made on heat-treated (homogenized) atomized metal, which because of the prolonged heating prior to extrusion loses the microinhomogeneity of as-atomized metal, exhibit a coarse grain structure. This is illustrated in the photomicrographs of Figs. 14 and 15, the extrusions being at 600° and 800° F. respectively. In obtaining the specimens for photomicrographs of Figs. 14 and 15 a quantity of the as-atomized alloy of Example 1 was placed in a 3-inch container heated to 600° F. in the one instance and 800° F. in the other, and after one hour's heating, the metal, while still at heat, was compacted and die-expressed into ⅜-inch diameter rod. As illustrative of the microstructure of the products of other comparative procedures, for example using mechanically comminuted metal in one instance and solid as-cast metal in another, reference is made to the photomicrographs of Figs. 16 and 17 respectively. In Fig. 16 the reduction in area of the metal was 51:1, and although the extrusion was made from a compact of comminuted metal and at comparable times and reduction in area to those of Figs. 12 and 13, nevertheless a coarse grained homogenized structure, substantially free from coring, resulted. This homogenized coarse grained structure is similar to that shown in Fig. 17 which is the coarse grained homogenized structure of the conventional die-expressed article of a magnesium-base alloy.

The improvement in mechanical properties, especially either or both the tensile strength and compression strength, is further demonstrated in the following series of comparative tests, the data of which are set forth in Table III. In these tests various magnesium-base alloys of specified nominal composition were melted in conventional manner. The molten metal was then atomized at temperatures between about 50 and 150 Fahrenheit degrees above their melting points, using natural gas (largely methane) for the dispersing and chilling step. The as-atomized powder thus obtained was heated, compacted, and extruded (within ten minutes) in accordance with the method of the invention, the temperature of the heating and compacting being the same as that set forth for the extrusion step. For comparison the same alloys, in the form of solid as-cast billets, were conventionally extruded under the same conditions of temperature and time to yield extrusions of the same cross section as those produced from the atomized metal. As an additional comparison, run No. 21 is included in the Table III using comminuted cast metal, as distinguished from atomized metal, for the charge of the extrusion container.

TABLE III

| Form of Metal before Compacting and Extrusion | Nominal Composition, Balance Being Magnesium | | | | | Extrusion Conditions | | | Extruded Properties | | | | Run No. |
|---|---|---|---|---|---|---|---|---|---|---|---|---|---|
| | Percent Al | Percent Zn | Percent Mn | Percent Ce | Percent Zr | Reduction in Area | Extrusion Speed, ft./min. | Extrusion Temp., °F. | Percent E | T.Y.S. (1000's p.s.i.) | C.Y.S. (1000's p.s.i.) | T.S. (1000's p.s.i.) | |
| Billet | | 1 | | | | 64:1 | 5 | 600 | 16 | 27 | 17 | 38 | 1 |
| Atomized | | 1 | | | | 64:1 | 5 | 600 | 16 | 32 | 22 | 41 | 2 |
| Billet | 6 | 1 | 0.2 | | | 64:1 | 5 | 700 | 10 | 35 | 23 | 47 | 3 |
| Atomized | 6 | 1 | 0.2 | | | 64:1 | 5 | 700 | 14 | 35 | 33 | 48 | 4 |
| Billet | 8 | 0.5 | 0.2 | | | 64:1 | 5 | 700 | 10 | 36 | 26 | 48 | 5 |
| Atomized | 8 | 0.5 | 0.2 | | | 64:1 | 5 | 700 | 15 | 36 | 34 | 52 | 6 |
| Billet | | | 2 | 6 | | 36:1 | 5 | 900 | 9 | 27 | | 36 | 7 |
| Atomized | | | 2 | 6 | | 36:1 | 5 | 900 | 2 | 46 | 44 | 49 | 8 |
| Billet | | 2 | 2 | | | 64:1 | 5 | 700 | 12 | 29 | 14 | 40 | 9 |
| Atomized | | 2 | 2 | | | 64:1 | 5 | 700 | 15 | 38 | 37 | 45 | 10 |
| Billet | 6 | 2 | 0.2 | | | 64:1 | 5 | 600 | 16 | 30 | 21 | 47 | 11 |
| Atomized | 6 | 2 | 0.2 | | | 64:1 | 5 | 600 | 16 | 34 | 32 | 49 | 12 |
| Billet | | | | 0.1 | 0.5 | 64:1 | 5 | 600 | 20 | 26 | 25 | 37 | 13 |
| Atomized | | | | 0.1 | 0.5 | 64:1 | 5 | 600 | 2 | 48 | 44 | 50 | 14 |
| Billet | | 3.7 | 1.49 | | | 64:1 | 5 | 600 | 15 | 40 | 30 | 46 | 15 |
| Atomized | | 3.98 | 1.20 | | | 64:1 | 5 | 600 | 15 | 40 | 36 | 46 | 16 |
| Billet | | 6 | 2 | | | 64:1 | 10 | 650 | 12 | 33 | 27 | 46 | 17 |
| Atomized | | 6 | 2 | | | 64:1 | 10 | 650 | 8 | 42 | 27 | 49 | 18 |
| Billet | 6 | | | | | 102:1 | 2 | 700 | 17 | 22.5 | | 39.7 | 19 |
| Atomized | 6 | | | | | 102:1 | 2 | 700 | 15 | 26 | | 43 | 20 |
| Billet | 6 | | | | | 102:1 | 2 | 700 | 13.5 | 19.4 | | 42.5 | 21 |
| Comminuted [1] | 6 | | | | | 64:1 | 5 | 600 | 7 | 30 | 29 | 41 | 22 |
| Atomized | | | 1.5 | | | 64:1 | 5 | 600 | 24 | 28 | 23 | 38 | 23 |
| Billet | | | 1.5 | | | 64:1 | 15 | 650 | 2 | 24 | 25 | 35 | 24 |
| Atomized | | | 1.5 | | | 64:1 | 15 | 650 | 19 | 18 | 14 | 35 | 25 |
| Billet | | | 1.5 | | | | | | | | | | |

All billets "as cast".

[1] Comminuted by milling cast billet to particle size through 48-mesh, retained on 100-mesh. All atomized metal particle size through 28 mesh retained on 325 except run No. 24 which passes 48-mesh and is retained on 100-mesh. Atomized metal in as-atomized condition. Even numbered runs carried out according to method of invention, odd numbered runs for comparison. Extrusion container 3-inch inside diameter.

Referring to Table III it will be observed that a marked improvement in strength of the die-expressed product results from the operation of the method of the invention i. e., the even numbered runs as compared to all the comparative or odd numbered runs.

We claim:

1. The method of making a die-expressed article of a magnesium-base alloy containing at least about 80 per cent of magnesium and comprising a solid solution in the magnesium of alloyed metal in the amount of at least about 0.3 per cent by weight which comprises atomizing the alloy so as to convert the same into a mass of fine individually frozen particles having a microstructure of fine microinhomogeneous grains between about 0.001 and 0.02 inch in diameter composed of cored dendrites of solid solution, heating the mass of as-atomized alloy to a temperature within the range of plastic deformation temperature of the alloy, applying pressure upon the heated mass so as to compact the same, and ram extruding the resulting compacted mass at a temperature within the aforesaid range, the reduction in cross sectional area of the compacted mass effected by the ram-extrusion being at least about 80 per cent, and said heating, compacting, and ram-extruding operations being completed within a matter of minutes so as to preserve substantially the microinhomogeneity of the as-atomized alloy.

2. The method according to claim 1 in which the alloyed metal comprises aluminum and the plastic deformation temperature is 600° to 800° F.

3. The method according to claim 1 in which the alloyed metal comprises aluminum and zinc and the plastic deformation temperature is 600 to 800° F.

DOUGLAS S. CHISHOLM.
ROBERT S. BUSK.

REFERENCES CITED

The following references are of record in the file of this patent:

UNITED STATES PATENTS

| Number | Name | Date |
|---|---|---|
| 1,570,868 | Templin | Jan. 26, 1926 |
| 1,594,347 | Bakken | Aug. 3, 1926 |
| 1,902,905 | Schreiber | Mar. 28, 1933 |
| 2,023,366 | Hoy | Dec. 3, 1935 |
| 2,371,105 | Lepsoe | Mar. 6, 1945 |
| 2,380,722 | Brown | July 31, 1945 |
| 2,391,752 | Stern | Dec. 25, 1945 |